US007825810B2

(12) United States Patent
Sakama et al.

(10) Patent No.: US 7,825,810 B2
(45) Date of Patent: Nov. 2, 2010

(54) RFID TAG READ SYSTEM AND METHOD OF READING RFID TAG

(75) Inventors: Isao Sakama, Hiratsuka (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 435 days.

(21) Appl. No.: 11/740,434

(22) Filed: Apr. 26, 2007

(65) Prior Publication Data
US 2008/0111662 A1 May 15, 2008

(30) Foreign Application Priority Data
Nov. 10, 2006 (JP) ............................. 2006-305898

(51) Int. Cl.
*G08B 13/14* (2006.01)

(52) U.S. Cl. ................. 340/572.7; 340/572.1; 343/731; 343/742; 343/893; 343/912

(58) Field of Classification Search ............. 340/572.7, 340/572.1; 343/731, 742, 743, 893, 912, 343/913, 739
See application file for complete search history.

(56) References Cited
U.S. PATENT DOCUMENTS
5,943,017 A * 8/1999 Cosenza et al. ....... 343/700 MS 7,439,863 B2 * 10/2008 Suzuki et al. ............ 340/572.7
7,518,221 B2 * 4/2009 Gaucher et al. ............ 257/676
2006/0044200 A1 * 3/2006 Mori ........................ 343/770
2006/0103532 A1 5/2006 VanFleet FOREIGN PATENT DOCUMENTS
| EP | 1308872 | 5/2003 |
|---|---|---|
| EP | 1701296 | 9/2006 |
| JP | 62-206903 | 9/1987 |
| JP | 2004-199226 | 7/2004 |
| JP | 2004-266549 | 9/2004 |

* cited by examiner

*Primary Examiner*—George A Bugg
*Assistant Examiner*—Hongmin Fan
(74) *Attorney, Agent, or Firm*—Mattingly & Malur, P.C.

(57) ABSTRACT

A RFID tag read equipment includes a read device and an antenna system including first to third antennas. The read device outputs the question wave as a high-frequency current, and reads the predetermined data by demodulating the answer wave when the answer wave is inputted therein as a high-frequency current. The first to third antennas output the high-frequency current when they receive the electromagnetic wave, and radiate the electromagnetic wave when the high-frequency current is inputted therein. Here, the first antenna is connected to the read device via a feeder wire, the second antenna being located such that its radiation direction is made parallel and opposite to radiation direction of the first antenna, the third antenna being connected to the second antenna via a feeder wire.

13 Claims, 7 Drawing Sheets

RFID TAG READ SYSTEM AND METHOD OF READING RFID TAG

INCORPORATION BY REFERENCE

The present application claims priority from Japanese application JP2006-305898 filed on Nov. 10, 2006, the content of which is hereby incorporated by reference into this application.

BACKGROUND OF THE INVENTION

The present invention relates to a RFID tag read system and a RFID tag read method for making it possible to easily set the geometry of a read area in which a RFID tag becomes readable.

A RFID tag is so configured as to include an IC chip and a tag antenna connected to this IC chip. The RFID tag is classified into non-cell type including no cell, and cell type including a cell. An operation example of the non-cell type RFID tag is, for example, as follows: Namely, when a predetermined question radio wave is transmitted to the RFID tag by raising antenna of a reader, an answer radio wave for indicating identifier data stored in the IC chip is transmitted from the RFID tag. Moreover, the reader demodulates this answer radio wave. This process makes it possible to read the identifier data in a non-contact manner.

The non-cell type RFID tag extracts its operation power from a radio wave which the reader radiates thereto. Accordingly, remaining capacity of a cell will not exhaust out, and thus no life expectancy will expire. Also, the non-cell type RFID tag is not equipped with the bulky cell. Consequently, the RFID tag exhibits an advantage of being capable of implementing small size, light weight, and low price. In its operation power, however, the non-cell type RFID tag is dependent on the electromagnetic energy fed from the outside. As a result, causing the RFID tag to operate requires that the RFID tag be irradiated with an electromagnetic wave whose intensity is comparatively high.

In some cases, the reader of a RFID tag whose communications frequency band is higher than the UHF band, e.g., a 2.45-GHz band, is equipped with patch antennas as the reader antenna for transmission/reception of the radio wave. In this case, dimension of the patch is equal to substantially 5 cm. Accordingly, it has been considered that the number of the patches be increased in order to enlarge the readable range. Increasing the number of the patches, however, has resulted in occurrence of the following problems: Namely, (1) the readable range becomes narrower, although gain enhances in a distant area. Also, the electromagnetic wave intensity in a proximate area becomes smaller, since high-frequency power fed depending on the number of the patches disperses. (2) The number of clearances between the patches increases, and thus these clearances increase the number of dead zones in the proximate area. On account of these problems, it has been wished to make it possible to easily set the geometry of a read area in which the RFID tag becomes readable.

Conventionally, there has been known the following "reader/writer antenna" (Refer to, e.g., JP-A-2004-199226 (paragraph [0018], FIG. 3)): Namely, a communications area is divided into four by four square loop antennas, and current phases of the respective loop antennas which implement the four divisions are shifted by 90°, respectively. This shift processing rotates resultant occurrence magnetic fields with frequency of driving power, thereby relaxing directivity specific to the loop antennas. Simultaneously, this shift processing enhances uniformity of radiation electric-field intensities of the four loop antennas, thereby decreasing a communications-incapable area due to direction of the tag. Simultaneously, this shift processing permits accomplishment of suppression of the electromagnetic radiation from the reader/writer antenna.

Also, there has been known the following "antenna device" (Refer to, e.g., JP-A-2004-266549 (paragraphs [0014] to [0015], FIG. 3)): Namely, first to third planar patch antennas are located on a side plane along displacement direction of a wireless tag such that the first to third patch antennas are arranged side by side in the up-and-down direction and on the forward side of displacement direction of the first and third planar patch antennas. This arrangement is made in order that the first to third patch antennas will not be overlapped with each other on the side plane. Simultaneously, the second planar patch antenna is located in proximity to the first and third planar patch antennas and on the backward side of the displacement direction. This location makes the first and third planar patch antennas and part of the second planar patch antenna look overlapped with each other when seen from the displacement direction of the wireless tag.

SUMMARY OF THE INVENTION

In the above-described "reader/writer antenna" (disclosed in JP-A-2004-199226), however, the phases of the currents fed to the adjacently located loop antennas need to be shifted. Accordingly, even if the loop antennas are used in large number, only a planar geometry can be formed. On account of this, there has existed a problem that the geometry of a communications-capable area in proximity to the loop antennas can also be formed only in the planar manner. Also, profile of the loop antennas configuring this "reader/writer antenna" is limited to the loop profile. As a result, when using the "reader/writer antenna" at a frequency exceeding an order of 30 MHz, the "reader/writer antenna" needs to be configured with the microscopic and enormous number of loop antennas. Consequently, there has existed a problem that manufacturing and practical commercialization of the "reader/writer antenna" is difficult to accomplish.

Also, the above-described "antenna device" permits accomplishment of the following object: Namely, when the wireless tag, which displaces in the fixed direction, i.e., displaces in the straight-line manner, passes through within a predetermined width, the wireless tag receives an electromagnetic wave from any one of the first to third patch antennas, thereby eliminating a dead zone when seen from the displacement direction of the wireless tag. Consequently, there has existed a problem that it is impossible to configure the "antenna device" so as to make it possible to set a desired read area, and to read the wireless tag existing within this read area.

Moreover, in an embodiment of the above-described "antenna device", a high-frequency signal multiplexed by frequency division, time division, or code division is configured to be transmitted to each planar patch antenna. Also, in another embodiment of the above-described "antenna device", a high-frequency signal from one questioner is configured to be switched to a plurality of planar patch antennas by a switcher. Namely, there has existed a problem that the "antenna device" includes a plurality of questioners or one switcher, and needs to perform complicated controls for the multiplexing and switching of a signal.

The present invention has been devised in view of the above-described problems. Namely, an object of the present invention is to provide a RFID tag read system and a RFID tag read method for making it possible to easily form the geometry of a read area into a desired geometry, the read area being an area in which the RFID tag becomes readable.

In order to accomplish the above-described object, the RFID tag read system of the present invention is a RFID tag read system for reading predetermined data from a RFID tag, the RFID tag radiating an answer wave as an electromagnetic wave when the RFID tag receives a question wave as an electromagnetic wave, the answer wave including the predetermined data, the RFID tag read system including a read device, and an antenna system including first to third antennas, wherein the first antenna is connected to the read device via a first feeder wire, the second antenna being located such that radiation direction of the second antenna is made parallel and opposite to radiation direction of the first antenna, the third antenna being connected to the second antenna via a second feeder wire. With respect to concrete technological ideas of the RFID tag read system, the detailed description will be given below via explanation of each embodiment according to the present invention.

According to the present invention, it becomes possible to provide a RFID tag read system and a RFID tag read method for making it possible to easily set the geometry of an area into a desired geometry, the area being an area in which communications with the RFID tag are executable.

Other objects, features and advantages of the invention will become apparent from the following description of the embodiments of the invention taken in conjunction with the accompanying drawings.

DESCRIPTION OF THE INVENTION

Hereinafter, referring to each appended drawing, the detailed explanation will be given below concerning each embodiment according to the present invention.

Incidentally, RFID tag read equipments 1 to 6 of first to sixth embodiments which will be explained hereinafter are one example where the RFID tag read system according to the present invention is embodied. Namely, an electromagnetic wave is transmitted into a predetermined read area, or an electromagnetic field is generated therein. Then, depending on this electromagnetic wave or electromagnetic field, a RFID tag (not illustrated) existing within this read area transmits an electromagnetic wave, or generates an electromagnetic field. Moreover, by receiving this electromagnetic wave or electromagnetic field, data is read from this RFID tag in a non-contact manner.

1st Embodiment

Figure 1:
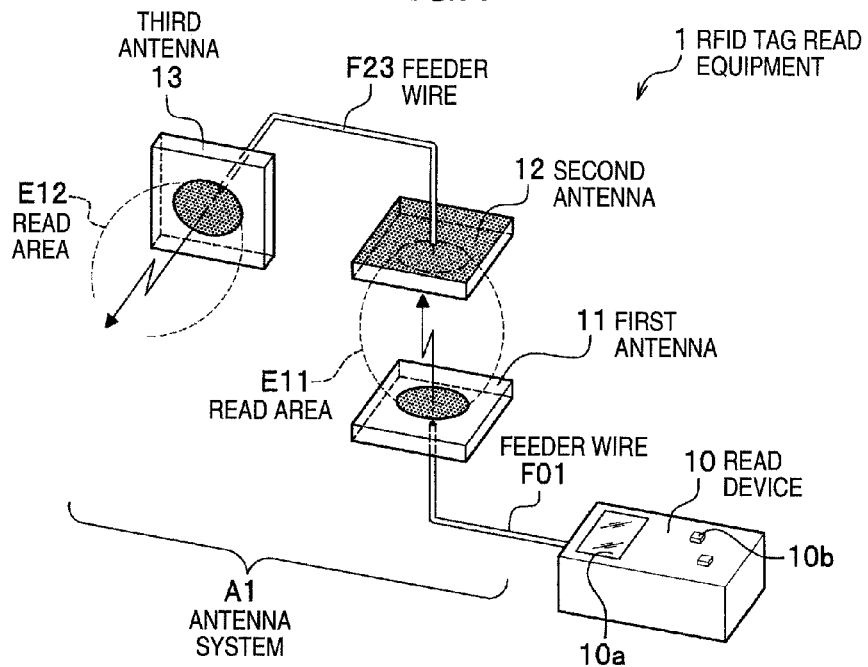
FIG. 1 is a layout perspective diagram for illustrating a RFID tag read equipment of a first embodiment according to the present invention.

FIG. 1 is a layout perspective diagram for illustrating a RFID tag read equipment 1 of a first embodiment according to the present invention.

This RFID tag read equipment 1 includes a read device 10 and an antenna system A1 which is connected to this read device 10.

Each RFID tag has the following function: Namely, when each RFID tag receives a question wave radiated from the antenna system A1, each RFID tag, depending on the question wave, radiates an answer wave for indicating data which is stored in each RFID tag, or which is created. The data transmitted from each RFID tag includes data on an identifier for indicating each RFID tag uniquely.

Each RFID tag is fabricated by, e.g., connecting a tag antenna to a RFID-tag-purpose IC chip such as Mu Chip (registered trademark) whose development and fabrication has been performed by the present Applicant.

As each RFID tag, a RFID tag which is equipped with a cell as the power source can also be used. This RFID tag radiates an answer wave with a predetermined period autonomously, i.e., even if the RFID tag does not receive a question wave. In this case, the read device 10 is not necessarily required to have the transmission function for outputting the question wave.

As the read device 10, a read device which is similar to the already-existing RFID-tag reader can be used. In this read device 10, however, a (not-illustrated) coaxial connector (jack, receptacle) of SMA type for high-frequency input/output is provided onto a housing in substitution for a built-in antenna. In the read device 10, operating an operation unit 10b including buttons and the like makes it possible to perform respective types of hand-operated controls such as reading of the RFID tag. Also, in the read device 10, information such as contents of the data read and operation situation of the read device 10 itself are displayed on a display unit 10a which includes a liquid-crystal display.

Feeder wires F01 and F23 are communications lines which are capable of transmitting a high-frequency current with a low loss, and which include, e.g., coaxial cables. Both ends of each of these feeder wires F01 and F23 are terminated with coaxial connectors (plagues) whose type is the same as the above-described coaxial connector of the read device 10, but whose plug side and socket side are different therefrom. Characteristic impedance Z0 of the feeder wire F01 is equal to, e.g., Z0=50[Ω], and the above-described connectors and the like are so designed as to match this characteristic impedance value. In the case of using the radio wave of a higher frequency band, e.g., the millimeter-wave band, it is preferable to use such lines as waveguide and NRD guide (: Nonradiative Dielectric Waveguide). One end of the feeder wire F01 is connected to the read device 10, and the other end thereof is connected to a first antenna 11.

Since the first antenna 11, a second antenna 12, and a third antenna 13 are of the same configuration, the explanation will be given below employing the first antenna 11 as the example.

However, the antennas of the same aerial wire type are not necessarily used as long as requirements which will be described later are satisfied.

The first antenna 11 is, typically, a patch antenna. In addition to the patch antenna, whatever antenna is preferably usable as the first antenna 11 as long as the antenna has unidirectivity, a main robe of appropriate wideness, a small side robe, a large front-to-rear ratio (i.e., radiation in the backward direction is small), and its polarized wave plane or circulating direction is controllable. As the example, there can be mentioned the patch antenna, Yagi-Uda antenna, end fire helical antenna, parabola antenna, slot antenna, or radio wave lens. Also, it is conceivable that loop antenna, side fire helical antenna, dipole antenna, folded-dipole antenna, or sleeve antenna be used depending on the conditions.

The first antenna 11 includes a substrate which is composed of a dielectric and whose front and rear surfaces are parallel flat planes, patch elements formed on one surface (front surface) of the substrate, and a ground plate formed on the other surface (rear surface) of the substrate. The direction in which the patch elements exist is the radiation direction of the radio wave. The substrate is composed of a material whose relative permittivity has been already known, such as a glass-fiber reinforced epoxy resin plate. The patch elements and the ground plate are composed of a high-frequency wave good conductor, such as copper plate or aluminum plate.

A receptacle (not illustrated) similar to that of the read device 10 is provided on the rear surface of the first antenna 11, and the feeder wire F01 is connected to the receptacle. Central conductor of the receptacle is connected to a predetermined location of the patch elements so that polarized wave characteristics of the first antenna 11 become desired characteristics. Also, an external conductor is connected to the ground plate.

The second antenna 12 is located such that the front surface of the second antenna 12 and the front surface of the first antenna 11 are faced to each other. More accurately, the second antenna 12 is located such that radiation direction of the second antenna 12 and radiation direction of the first antenna 11 are on the same axis and are oppositely oriented to each other. In other word, the second antenna 12 is located with respect to the first antenna 11 so that, when the distance between the first antenna 11 and the second antenna 12 is constant, the transmission/reception sensitivity therebetween becomes the highest. The second antenna 12 is connected to the third antenna 13 via the feeder wire F23.

Next, the explanation will be given below concerning outline of an operation example of the RFID tag read equipment 1.

Operating the read device 10 allows the read device 10 to start and perform the read operation. Namely, the read device 10 transmits a predetermined high-frequency current to the first antenna 11 via the first feeder wire F01. When this high-frequency current is fed to the first antenna 11, an electromagnetic wave is radiated from the first antenna 11 to the second antenna 12. This electromagnetic wave is a question wave for allowing the RFID tag to operate. This question wave makes intensity of the electromagnetic field within a predetermined read area E11 larger than a predetermined value, thereby allowing the RFID tag to operate which is positioned within the read area E11.

Having received this question wave, the second antenna 12 converts the electromagnetic wave into a high-frequency current again, then transmitting this high-frequency current to the third antenna 13 via the second feeder wire F23. When this high-frequency current is inputted into the third antenna 13, the third antenna 13 radiates the above-described question wave. This question wave makes intensity of the electromagnetic field within a predetermined read area E12 larger than a predetermined value, thereby allowing the RFID tag to operate which is positioned within the read area E12.

(1) When the question wave radiated from the first antenna 11 is received by the RFID tag positioned within the read area E11, an answer wave radiated from this RFID tag is received by the first antenna 11. Then, a high-frequency current indicating this answer wave is inputted into the read device 10. The read device 10 demodulates this high-frequency current, thereby reading data such as identifier of this RFID tag.

(2) When the question wave radiated from the third antenna 13 is received by the RFID tag positioned within the read area E12, an answer wave radiated from this RFID tag is received by the third antenna 13. Then, a high-frequency current indicating this answer wave is transmitted to the second antenna 12 via the second feeder wire F23, then becoming an electromagnetic wave again and thereby being received by the first antenna 11. The process hereinafter is basically the same as the process in the case of (1).

According to the RFID tag read equipment 1 of the first embodiment, it becomes possible to independently determine the relative position of the third antenna 13 with respect to the first antenna 11 and the second antenna 12. Accordingly, the first read area determined by the first antenna 11 and the second antenna 12 and the second read area determined by the third antenna 13 can be located with a high degree of freedom. Also, part of the energy of the electromagnetic wave radiated from the first antenna 11 is radiated from the third antenna 13 once gain. Consequently, even in the case of the same aerial wire power, the read range in proximity to the antennas can be substantially enlarged.

2nd Embodiment

Figure 2:
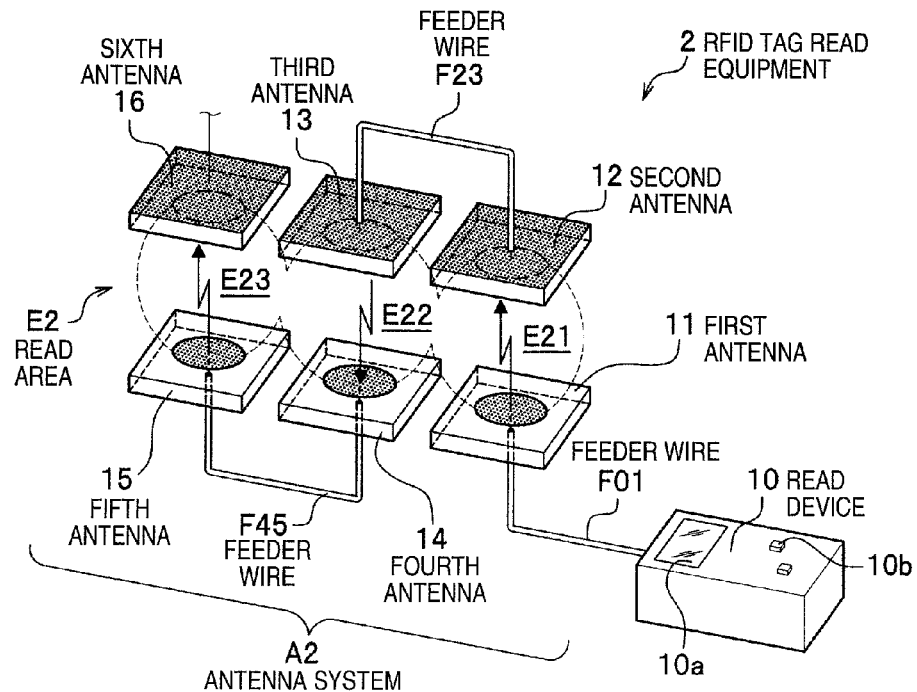
FIG. 2 is a layout perspective diagram for illustrating a RFID tag read equipment of a second embodiment according to the present invention.

FIG. 2 is a layout perspective diagram for illustrating a RFID tag read equipment 2 of a second embodiment according to the present invention.

The configuration of this RFID tag read equipment 2 is as follows: In the RFID tag read equipment 1 of the first embodiment, an antenna system A2 is provided in substitution for the antenna system A1.

In the antenna system A2, the radiation direction of the third antenna 13 of the antenna system A1 is made parallel to and the same direction as the second antenna 12 of the antenna system A1. The antenna system A2 further includes a fourth antenna 14 made parallel and opposite to the third antenna 13, a fifth antenna 15 connected to the fourth antenna 14 via a feeder wire F45 and having radiation direction which is parallel to and the same direction as the fourth antenna 14, and a sixth antenna 16 made parallel and opposite to the fifth antenna 15. Although the illustration is given up to the sixth antenna 16, a further antenna (not illustrated) may also be connected in the subsequent manner similarly.

On account of this configuration, an antenna pair including the first antenna 11 and the second antenna 12 forms a read area E21. Similarly, an antenna pair including the third antenna 13 and the fourth antenna 14 forms a read area E22. Similarly, an antenna pair including the fifth antenna 15 and the sixth antenna 16 forms a read area E23. Narrowing mutual intervals between these antenna pairs forms a read area E2, which results from connecting the read areas E21, E22, and E23 to each other. The formation of the read area E2 makes it possible to decrease dead zones.

Position of a feeding point of the patch elements, or profile or dimension of the patch element is changed for each combination of the antennas made parallel and opposite to each other. As a result of this change, by changing the circularly-polarized wave/linearly-polarized wave or the circulating direction/polarized wave direction for a radio wave to be radiated, it becomes possible to suppress an interference between the adjacent read areas for the RFID tags. This is made possible despite the fact that the signals with the same frequency are used.

According to the RFID tag read equipment 2 of the second embodiment, it becomes possible to further enhance the degree of freedom for location of the read areas. Also, since the number of the antennas increases, the read range in proximity to the antennas can be substantially enlarged further.

3rd Embodiment

Figure 3:
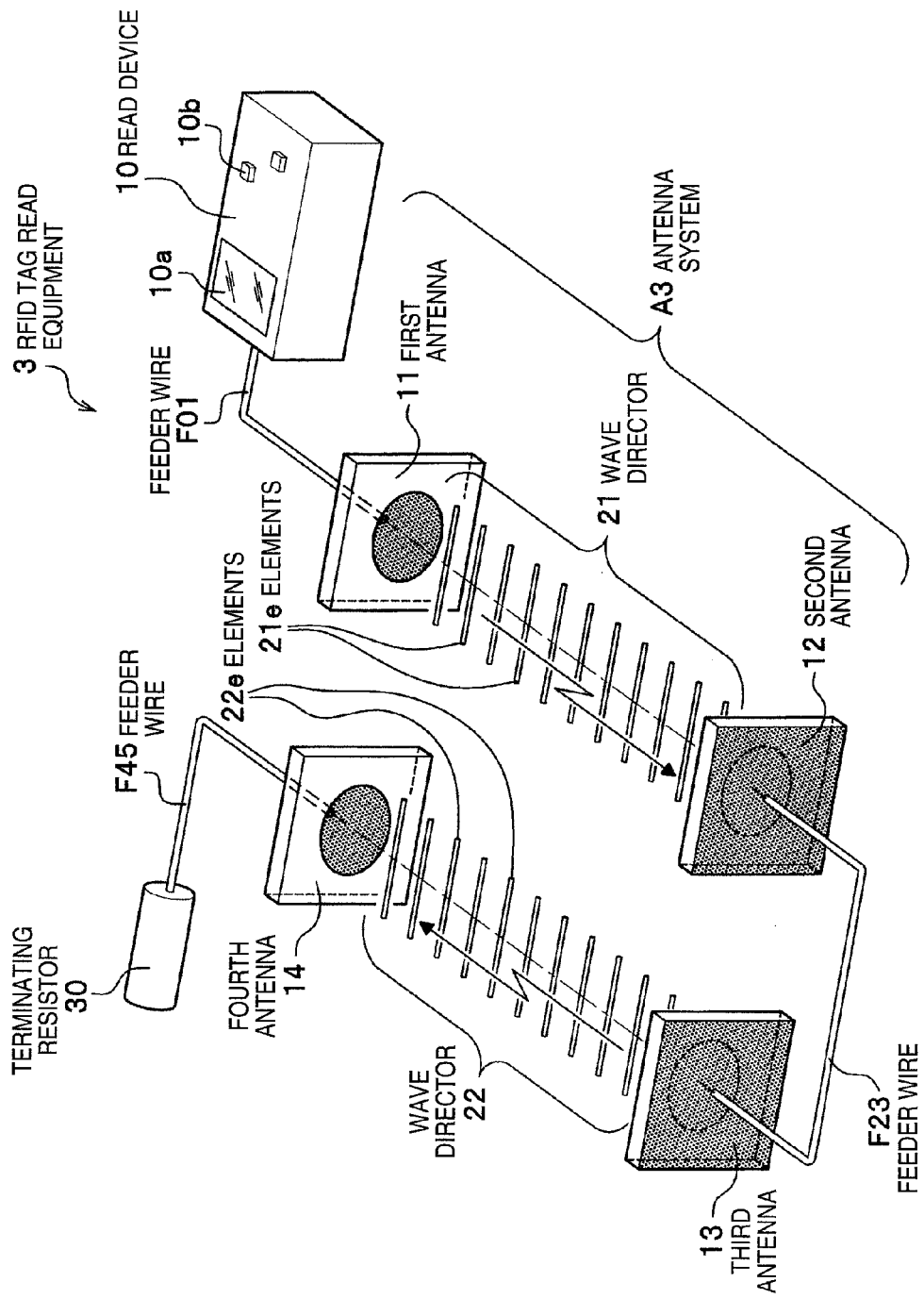
FIG. 3 is a layout perspective diagram for illustrating a RFID tag read equipment of a third embodiment according to the present invention.
Figure 4:
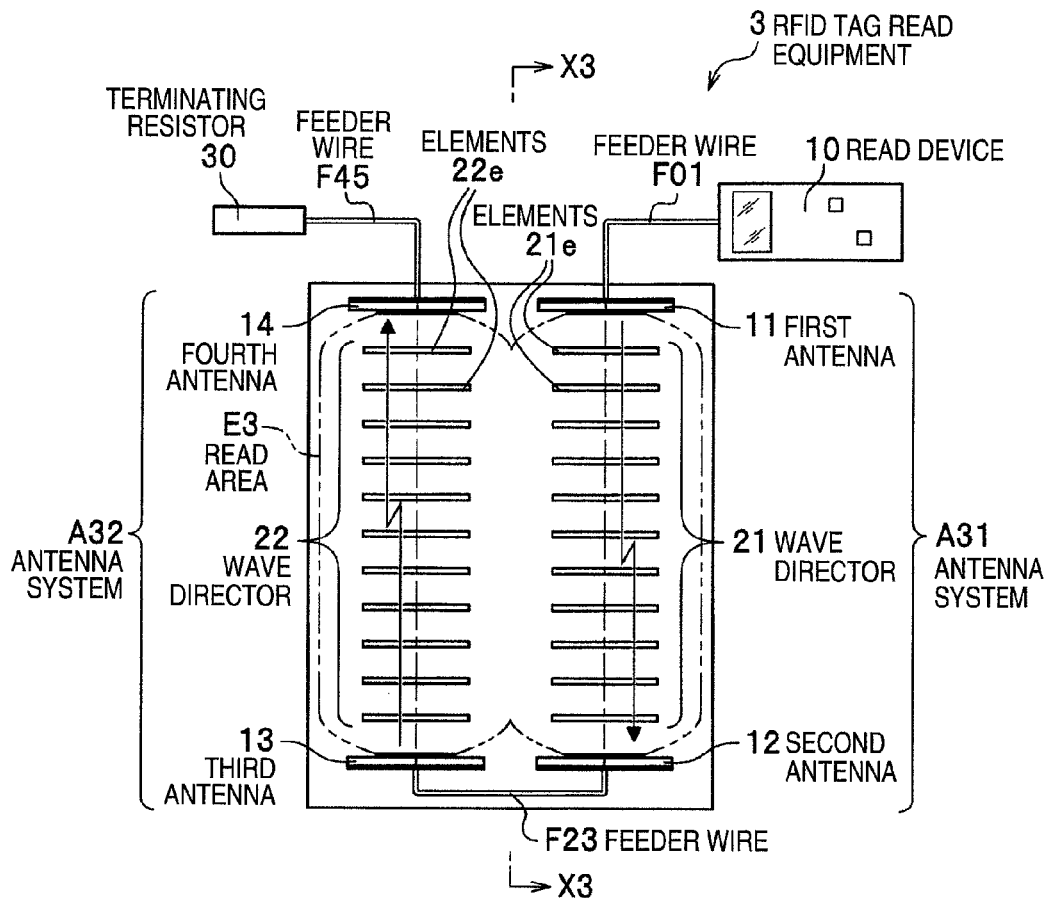
FIG. 4 is a plan view for illustrating the RFID tag read equipment of the third embodiment according to the present invention.
Figure 5:
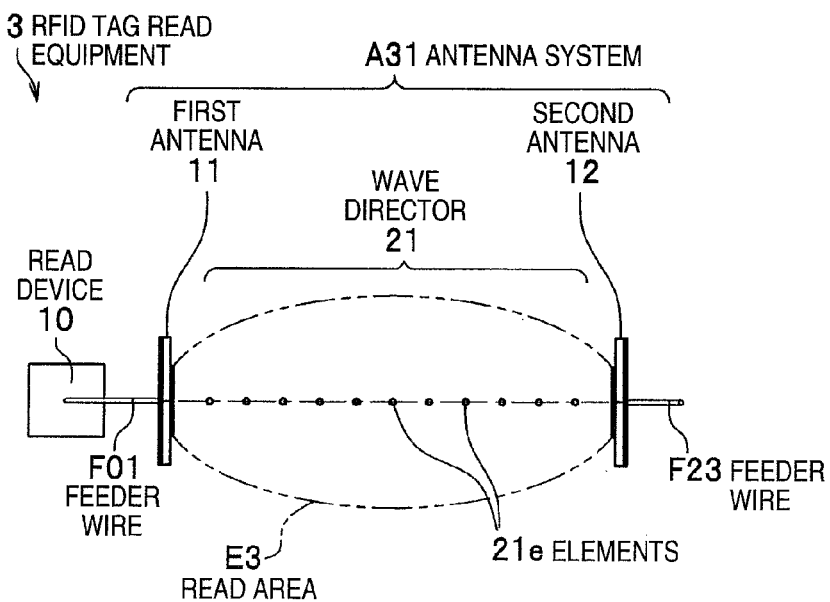
FIG. 5 is a location layout diagram of the RFID tag read equipment of the third embodiment according to the present invention when seen in the X3-X3 direction illustrated in FIG. 4.

FIG. 3 is a layout perspective diagram for illustrating a RFID tag read equipment 3 of a third embodiment according to the present invention. FIG. 4 is a plan view for illustrating the RFID tag read equipment 3 of the third embodiment according to the present invention. FIG. 5 is a location layout diagram of the RFID tag read equipment 3 of the third embodiment according to the present invention when seen in the X3-X3 direction illustrated in FIG. 4.

The configuration of this RFID tag read equipment 3 is as follows: In the RFID tag read equipment 2 of the second embodiment, the fifth antenna 15 and the sixth antenna 16 are removed, a wave director 21 is located between the first antenna 11 and the second antenna 12, a wave director 22 is located between the third antenna 13 and the fourth antenna 14, and a terminating resistor 30 is connected to the feeder wire F45.

The terminating resistor 30 is the so-called dummy load. The terminating resistor 30 includes a non-inductive resistance element showing substantially the same net resistance value as the characteristic impedance Z0 of the feeder wire F45 and the fourth antenna 14, and a heat sink into which heat is liberated from this non-inductive resistance element (neither of them is illustrated). Accordingly, all the energy of an electromagnetic wave which the fourth antenna 14 receives is consumed as thermal energy by the terminating resistor 30. Consequently, there occurs no reflection wave from the terminating resistor 30 to the fourth antenna 14. In this case, of the energy of the high-frequency current outputted from the read device 10, excessive energy is finally consumed by the terminating resistor 30. As a result, even if the output from the read device 10 is enhanced, intensity of an electromagnetic wave which leaks to outside of the RFID tag read equipment 3 can be made lower.

Instead of providing the terminating resistor 30, it is preferable to open terminal end of the feeder wire F45 (i.e., to set the feeder wire F45 into a state where it remains cut off), or to short-circuit the terminal end. In this case, when the RFID tag is positioned in proximity to the fourth antenna 14 in particular, the fourth antenna 14 reflects an answer wave radiated from the RFID tag, thereby enhancing intensity of the answer wave which the third antenna 13 receives. On account of this, the feeble answer wave radiated from the RFID tag becomes easier to recognize at the read device 10.

The wave director 21 is configured by arranging a large number of dipole-shaped elements 21e at an about one-fourth-wavelength interval and along the radiation direction of the first antenna 11. Here, electrical length of the element 21e is somewhat shorter than the one-second wavelength of the communications waves (i.e., question wave and answer wave). The wave director 21 can also be configured by alternatively using a wave director portion of the Yagi-Uda antenna which uses the same wavelength as that of the RFID tag read equipment 3. Also, instead of selecting the first antenna 11 as the reference, the second antenna 12 may be employed as the reference, and the elements 21e may be arranged along the radiation direction of the second antenna 12.

The wave director 22 is configured by arranging elements 22e along the radiation direction of the third antenna 13. With respect to the third antenna 13 and the fourth antenna 14, the wave director 22 has a configuration similar to the above-described wave director 21, and operates similarly.

In this way, the longitudinal direction of the dipole-shaped elements 21e and 22e is set as the horizontal direction. Accordingly, in each of the first antenna 11, the second antenna 12, the third antenna 13, and the fourth antenna 14, the patch elements are so configured as to radiate a horizontally-polarized wave. For example, the first antenna 11, the wave director 21, and the second antenna 12 are tilted in the same direction and at the same angle, and the polarized wave plane is rotated. This makes it possible to adjust a read area E3. Also, this makes it possible to suppress, of the read area E3, an interference between an area formed by the first antenna 11 and the second antenna 12 and an area formed by the third antenna 13 and the fourth antenna 14.

According to the RFID tag read equipment 3 of the third embodiment, the wave director 21 and the wave director 22 are provided. As a result, as illustrated in FIG. 4 and FIG. 5, uniform electromagnetic fields are generated in the surroundings of the elements 21e and the elements 22e. This makes it possible to form the read area E3 in which intensity of the electromagnetic field is stable in a wider range.

4th Embodiment

Figure 6:
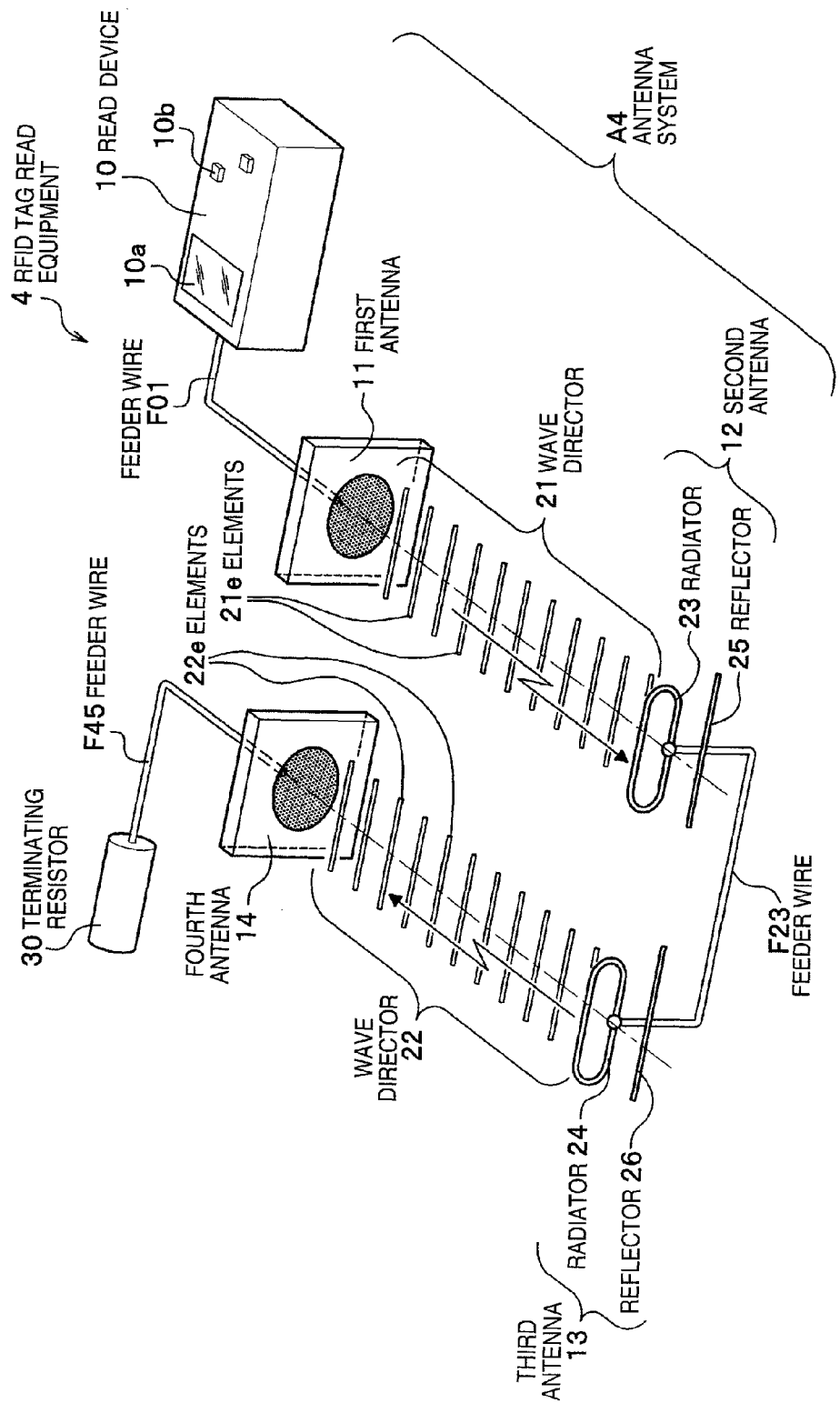
FIG. 6 is a layout perspective diagram for illustrating a RFID tag read equipment of a fourth embodiment according to the present invention.

FIG. 6 is a layout perspective diagram for illustrating a RFID tag read equipment 4 of a fourth embodiment according to the present invention.

The configuration of the RFID tag read equipment 4 of the fourth embodiment is as follows: In the RFID tag read equipment 3 of the third embodiment, as the second antenna 12, a radiator 23 including a folded-dipole antenna and a reflector 25 including a dipole antenna are provided in substitution for the patch antenna. Simultaneously, as the third antenna 13, a radiator 24 including a folded-dipole antenna and a reflector 26 including a dipole antenna are provided in substitution for the patch antenna.

Consequently, one Yagi-Uda antenna is formed by the reflector 25, the radiator 23, and the wave director 21. Simultaneously, another Yagi-Uda antenna is formed by the reflector 26, the radiator 24, and the wave director 22.

In this way, not being limited to the patch antenna, various types of unidirectivity antennas can be used preferably.

5th Embodiment

Figure 7:
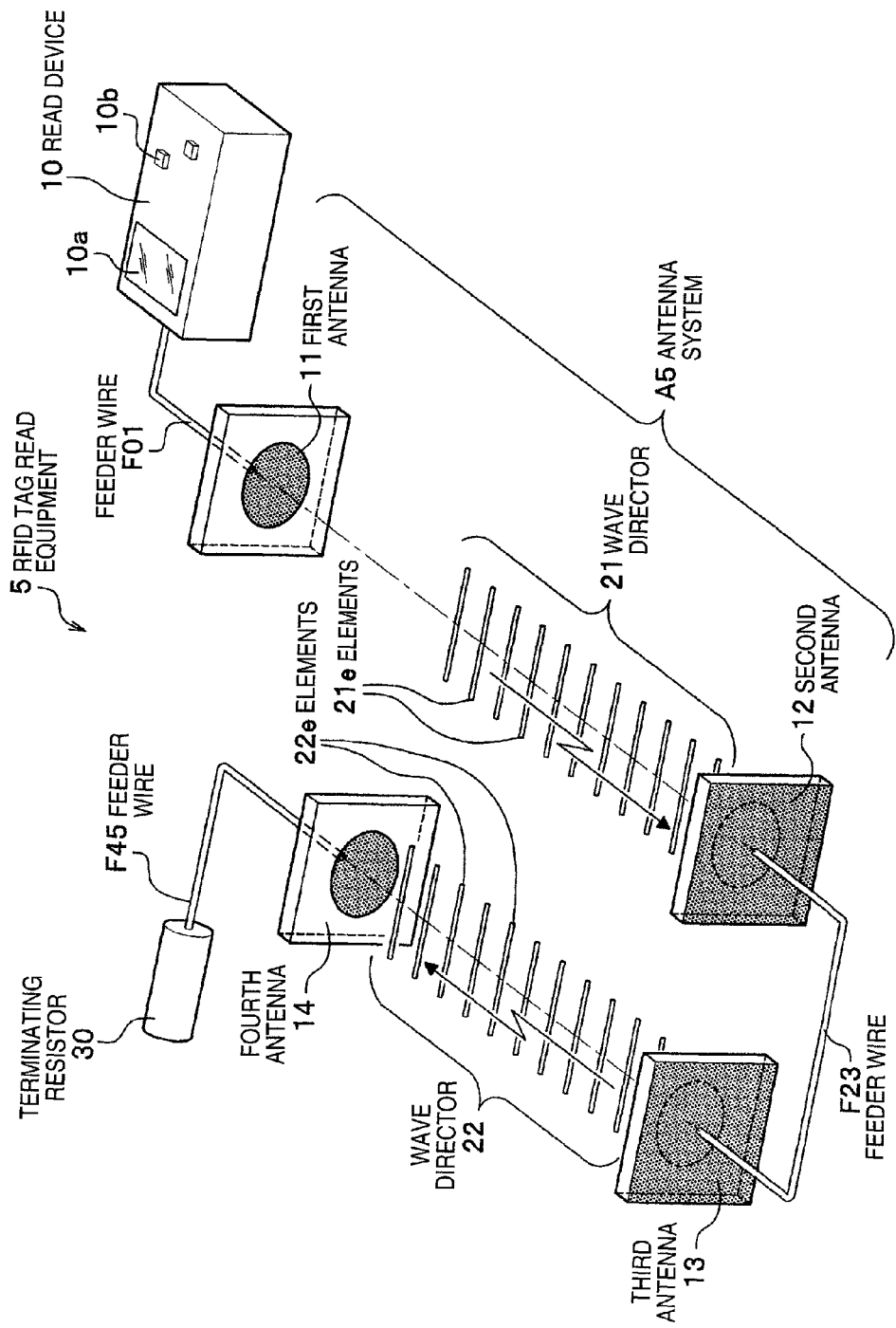
FIG. 7 is a layout perspective diagram for illustrating a RFID tag read equipment of a fifth embodiment according to the present invention.
Figure 8:
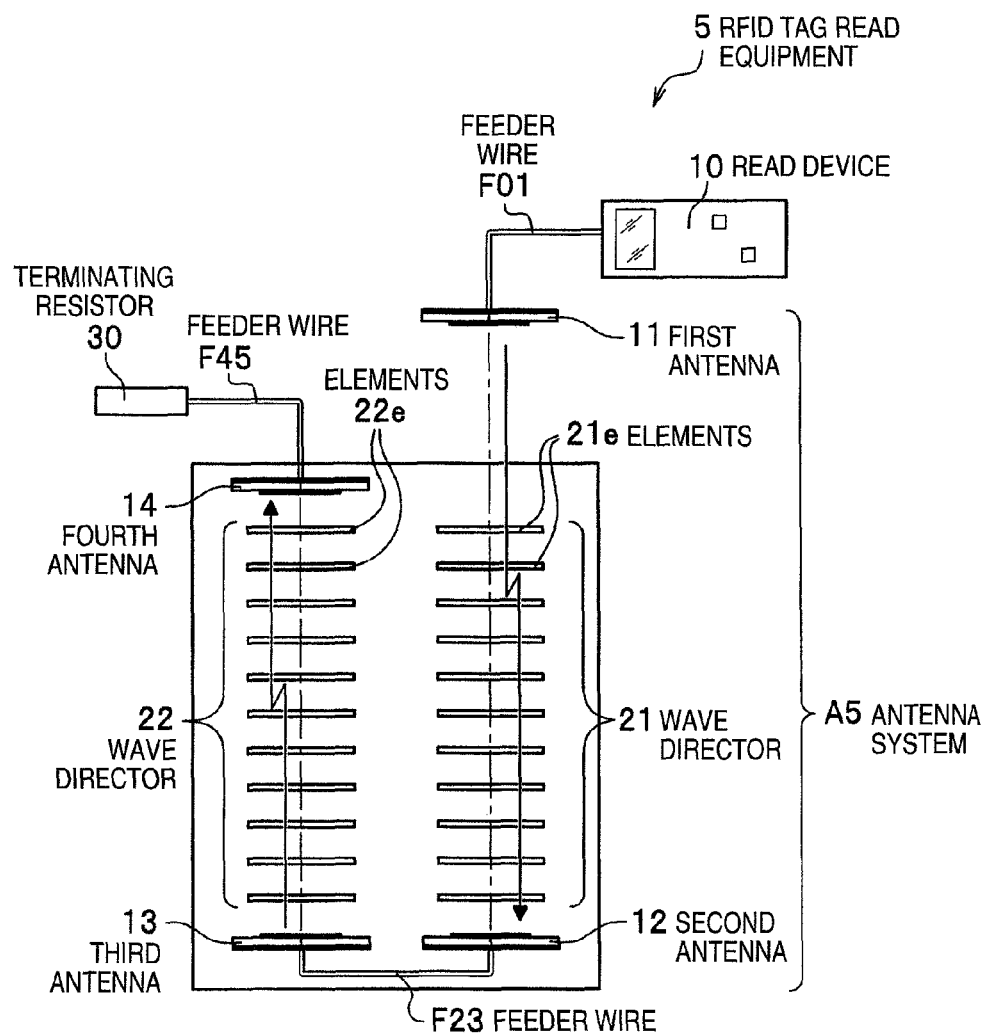
FIG. 8 is a plan view for illustrating the RFID tag read equipment of the fifth embodiment according to the present invention.

FIG. 7 is a layout perspective diagram for illustrating a RFID tag read equipment 5 of a fifth embodiment according to the present invention. FIG. 8 is a plan view for illustrating this RFID tag read equipment 5.

The configuration of the RFID tag read equipment 5 of the fifth embodiment is as follows: In the RFID tag read equipment 4 of the fourth embodiment, the read device 10, the feeder wire F01, and the first antenna 11 are integrated into one set by being separated from the other components. It is preferable that the components integrated into one set like this be set up on a (not-illustrated) base, or be stored into a (not-illustrated) housing whose relative permittivity is small.

On account of the configuration like this, the read device 10, the feeder wire F01, and the first antenna 11 can be used as a transportable tag reader. Otherwise, they are connected to each other as required, thereby being able to be used as the RFID tag read equipment 5 which has a wider read area.

Also, it becomes possible to easily set and change the distance between the first antenna 11 and the second antenna 12. Accordingly, the degree of freedom for the setting of a read area becomes larger.

6th Embodiment

Figure 9:
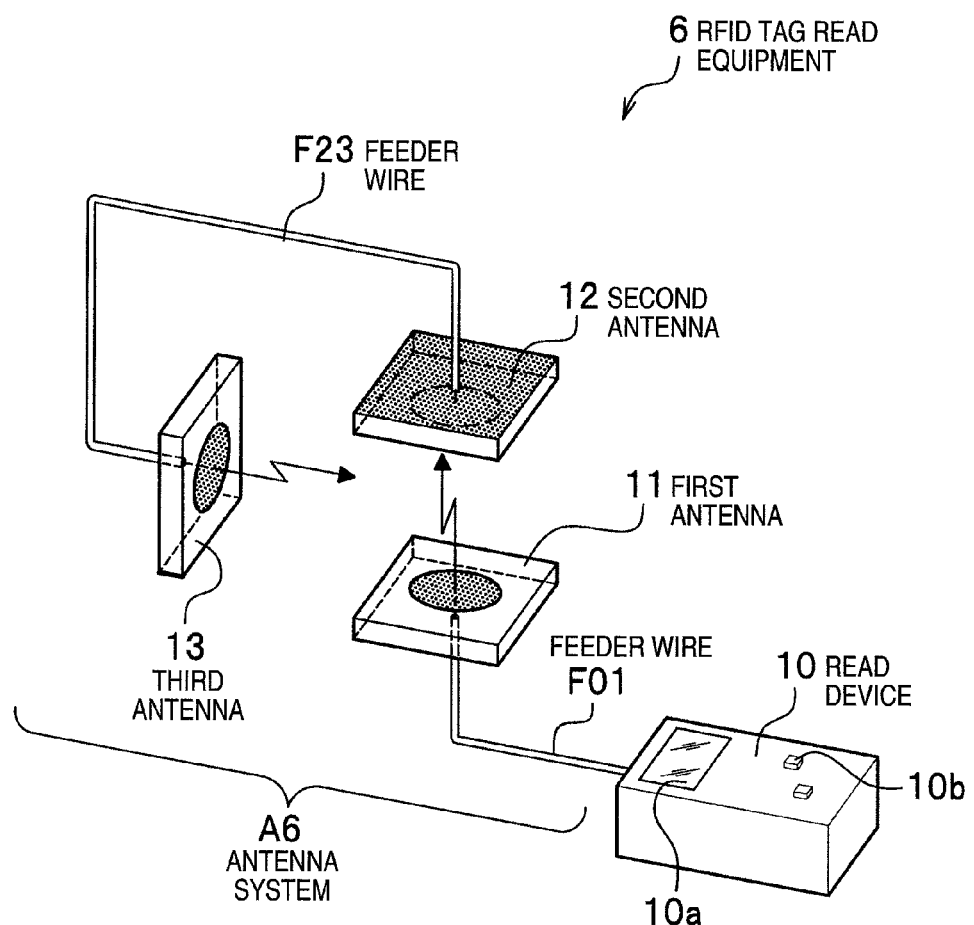
FIG. 9 is a layout perspective diagram for illustrating a RFID tag read equipment of a sixth embodiment according to the present invention.

FIG. 9 is a layout perspective diagram for illustrating a RFID tag read equipment 6 of a sixth embodiment according to the present invention.

The configuration of the RFID tag read equipment 6 of the sixth embodiment is as follows: In the RFID tag read equipment 1 of the first embodiment, the third antenna 13 is located in such a manner that the radio wave radiated from the third antenna 13 cuts across the radiation direction of the first antenna 11 and the radiation direction of the second antenna 12.

According to the RFID tag read equipment 6 of the sixth embodiment, the electromagnetic fields of different traveling directions or different polarized waves are formed in the read areas. As a result, even if a RFID tag which has azimuth-orientation dependence in the transmission/reception of a radio wave, a probability of being capable of reading data properly is enhanced regardless of the orientation of this RFID tag.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A RFID tag read system for reading predetermined data from a RFID tag, said RFID tag radiating an answer wave as an electromagnetic wave when said RFID tag receives a question wave as an electromagnetic wave, said answer wave including said predetermined data, said RFID tag read system, comprising:
a read device for outputting said question wave as a high-frequency current, and reading said predetermined data by demodulating said answer wave when said answer wave is inputted therein as a high-frequency current,
an antenna system including first to third antennas for outputting said high-frequency current when said first to third antennas receive said electromagnetic wave, and radiating said electromagnetic wave when said high-frequency current is inputted therein, wherein
said first antenna is connected to said read device via a first feeder wire,
said second antenna is located such that radiation direction of said second antenna is made parallel and opposite to radiation direction of said first antenna,
said third antenna is connected to said second antenna via a second feeder wire,
each of said first, second and third antennas is an unidirectional antenna, and
a fourth antenna for outputting said high-frequency current when said fourth antenna receives said electromagnetic wave, and radiating said electromagnetic wave when said high-fre-quency current is inputted therein,
said fourth antenna being located such that radiation direction of said fourth antenna is made parallel and opposite to radiation direction of said third antenna, and further comprising either of:
a first wave director for sharpening directivity of said electromagnetic waves by changing phases of said electromagnetic waves, said electromagnetic waves being transmitted/received by said first antenna and said second antenna, and
a second wave director for sharpening directivity of said electromagnetic waves by changing phases of said electromagnetic waves, said electromagnetic waves being transmitted/received by said third antenna and said fourth antenna.

2. The RFID tag read system according to claim 1, wherein said fourth antenna is connected to another different antenna system via a third feeder wire.

3. The RFID tag read system according to claim 1, wherein said fourth antenna is terminated by a resistor which shows the same resistance value as characteristic impedance of said fourth antenna.

4. The RFID tag read system according to claim 1, wherein an input/output end of said fourth antenna is terminally opened or terminally short-circuited.

5. The RFID tag read system according to claim 1, wherein said radiation direction of said first antenna and radiation direction of said third antenna are parallel and oppositely oriented to each other.

6. The RFID tag read system according to claim 1, wherein polarized wave planes or circulating directions of said electromagnetic waves transmitted/received by said first antenna and said second antenna are identical to each other, and
polarized wave planes or circulating directions of said electromagnetic waves transmitted/received by said third antenna and said fourth antenna are identical to each other.

7. The RFID tag read system according to claim 6, wherein said polarized wave planes or circulating directions of said electromagnetic waves transmitted/received by said first antenna and said second antenna, and said polarized wave planes or circulating directions of said electromagnetic waves transmitted/received by said third antenna and said fourth antenna are different from each other.

8. The RFID tag read system according to claim 1, wherein a first distance between said first antenna and said second antenna, and a second distance between said third antenna and said fourth antenna are different from each other.

9. The RFID tag read system according to claim 1, wherein said third antenna is located such that radiation direction of said third antenna cuts across said electromagnetic waves transmitted/received by said first antenna and said second antenna.

10. The RFID tag read system according to claim 1, wherein said fourth antenna is an unidirectional antenna.

11. The RFID tag read system according to claim 10, wherein any one of said first antenna through said fourth antenna is a patch antenna, a Yagi-Uda antenna, an end fire helical antenna, a parabola antenna, a slot antenna, or a radio wave lens.

12. The RFID tag read system according to claim 1, wherein any one of said first antenna through said fourth antenna is a loop antenna, a side fire helical antenna, a dipole antenna, a folded-dipole antenna, or a sleeve antenna.

13. A RFID tag read system for reading predetermined data from a RFID tag, said RFID tag radiating an answer wave as an electromagnetic wave when said RFID tag receives a question wave as an electromagnetic wave, said answer wave including said predetermined data, said RFID tag read system, comprising:

a read device for outputting said question wave as a high-frequency current, and reading said predetermined data by demodulating said answer wave when said answer wave is inputted therein as a high-frequency current, an antenna system including first to third antennas for outputting said high-frequency current when said first to third antennas receive said electromagnetic wave, and radiating said electromagnetic wave when said high-frequency current is inputted therein, wherein said first antenna is connected to said read device via a first feeder wire, said second antenna is located such that radiation direction of said second antenna is made parallel and opposite to radiation direction of said first antenna, said third antenna is connected to said second antenna via a second feeder wire, and each of said first, second and third antennas is an unidirectional antenna, and a plurality of dipole-shaped elements each being shorter than one-second wave length of a communication wave, wherein said dipole-shaped elements are arranged between said first antenna and said second antenna at a one-fourth-wave length interval.

* * * * *